April 22, 1924.

E. GALBOS

SAW SOLDERING MACHINE

Filed March 16, 1923　　3 Sheets-Sheet 1

1,491,297

Edmond Galbos
INVENTOR

BY Victor J. Evans
ATTORNEY

WITNESS: R. E. Wise.
P. C. Gannon.

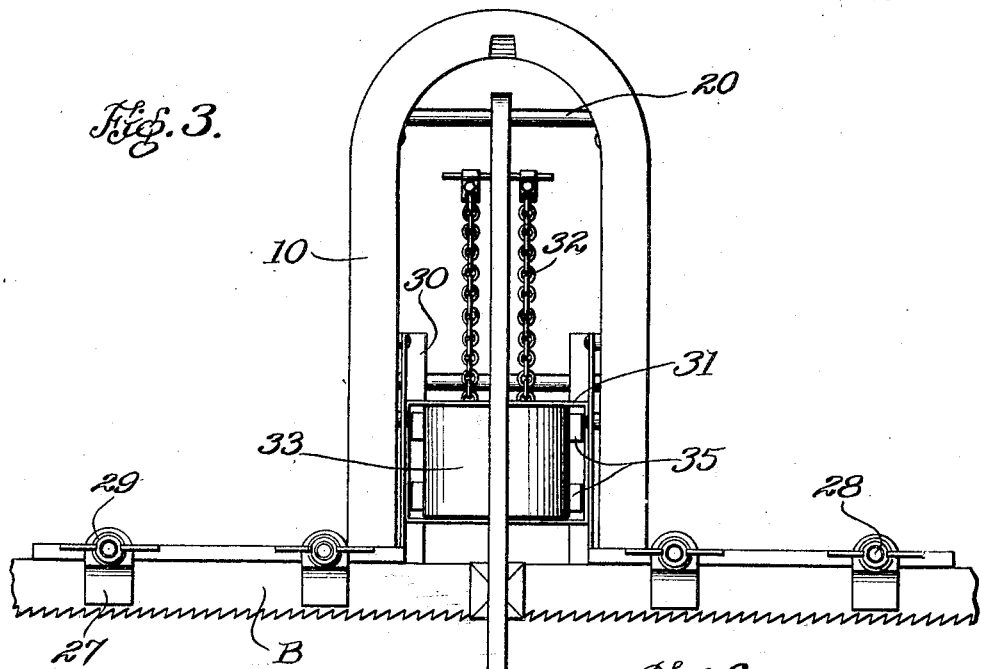
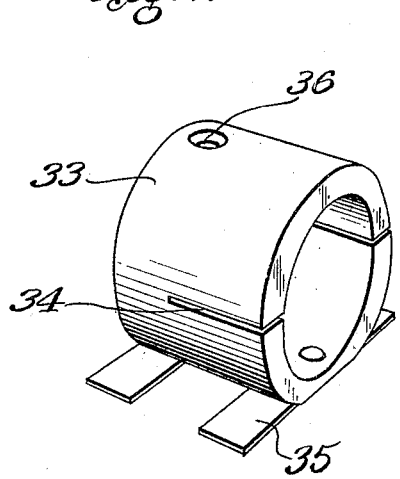
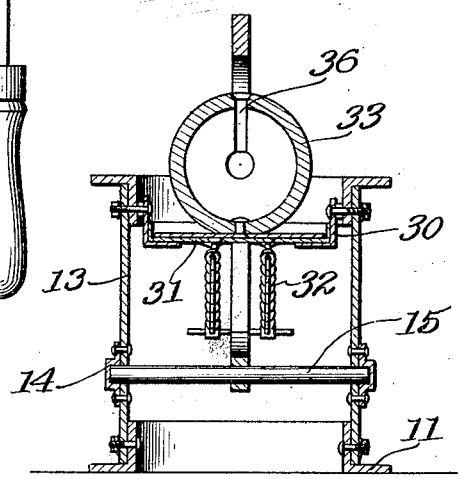

April 22, 1924.
E. GALBOS
SAW SOLDERING MACHINE
Filed March 16, 1923    3 Sheets-Sheet 3
1,491,297
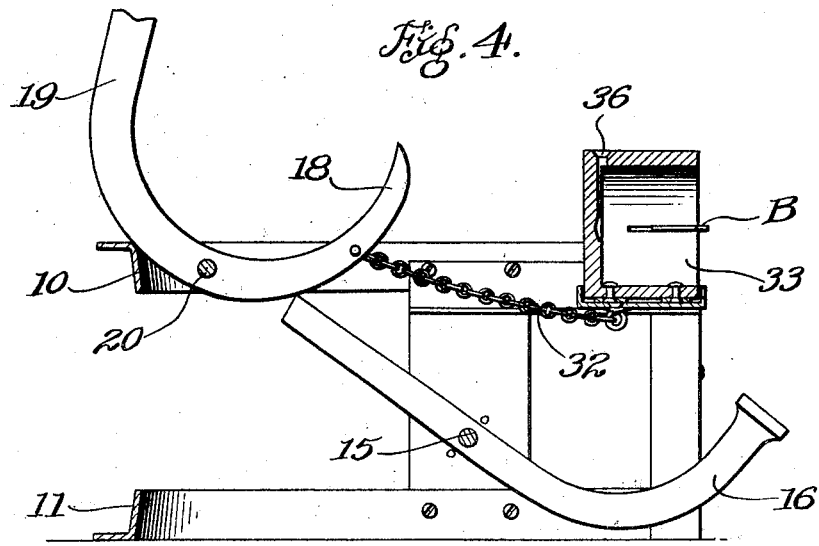
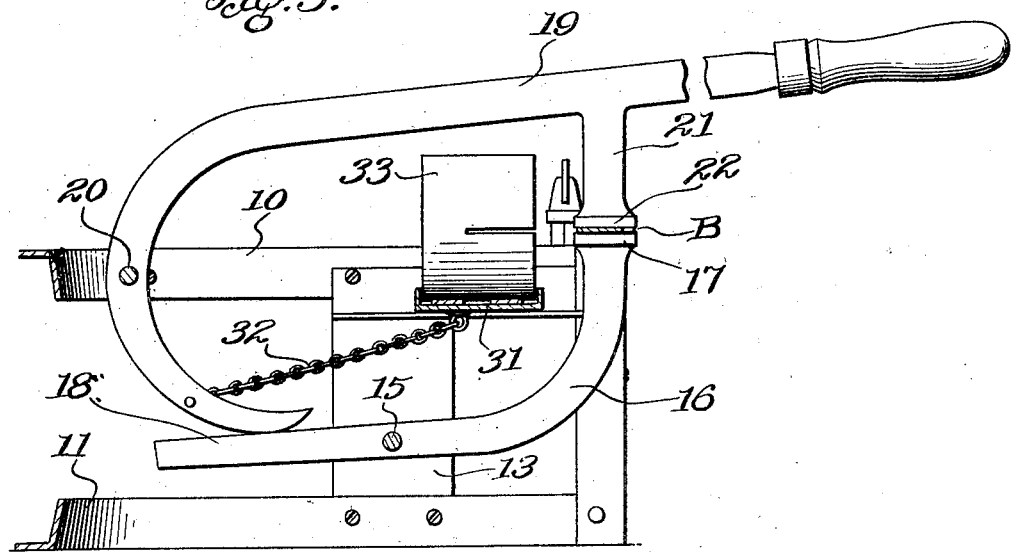
Edmond Galbos
INVENTOR
BY Victor J. Evans
ATTORNEY
WITNESS:

Patented Apr. 22, 1924.

1,491,297

UNITED STATES PATENT OFFICE.

EDMOND GALBOS, OF CLEVELAND, OHIO.

SAW-SOLDERING MACHINE.

Application filed March 16, 1923. Serial No. 625,600.

*To all whom it may concern:*

Be it known that I, EDMOND GALBOS, a citizen of the Republic of Hungary, residing at Cleveland, in the county of Cuyahoga and State of Ohio, have invented new and useful Improvements in Saw-Soldering Machines, of which the following is a specification.

This invention relates to soldering machines and has for an object the provision of a machine for holding articles during the application of solder and for aligning the ends of the joint, so as to provide a perfect connection, the machine being especially adapted for connecting the ends of band saw blades.

Another object of the invention is the provision of a machine whereby the ends of a saw blade may be held in proper alignment for the application of solder and pressure thereafter applied evenly and to opposite sides of the blade at the joint before the solder cools, so that a perfect connection may be obtained.

Another object of the invention is the provision of a furnace or heat chamber which may be moved into position to receive the ends of the blade to be joined, so as to confine the heat, the said chamber or furnace being thereafter automatically moved to an out-of-the-way position to permit of the application of pressure as above stated.

With the above and other objects in view, the invention further includes the following novel features and details of construction, to be hereinafter more fully described, illustrated in the accompanying drawings and pointed out in the appended claim.

In the drawings:—

Figure 3 is a top plan view.

Figure 4 is a vertical longitudinal sectional view with the parts in position for the application of heat.

Figure 5 is a similar view showing the furnace or heat chamber moved to a position to permit of the application of pressure.

Figure 6 is a transverse sectional view.

Figure 7 is a detail perspective view of the furnace or heat chamber.

Figure 1:
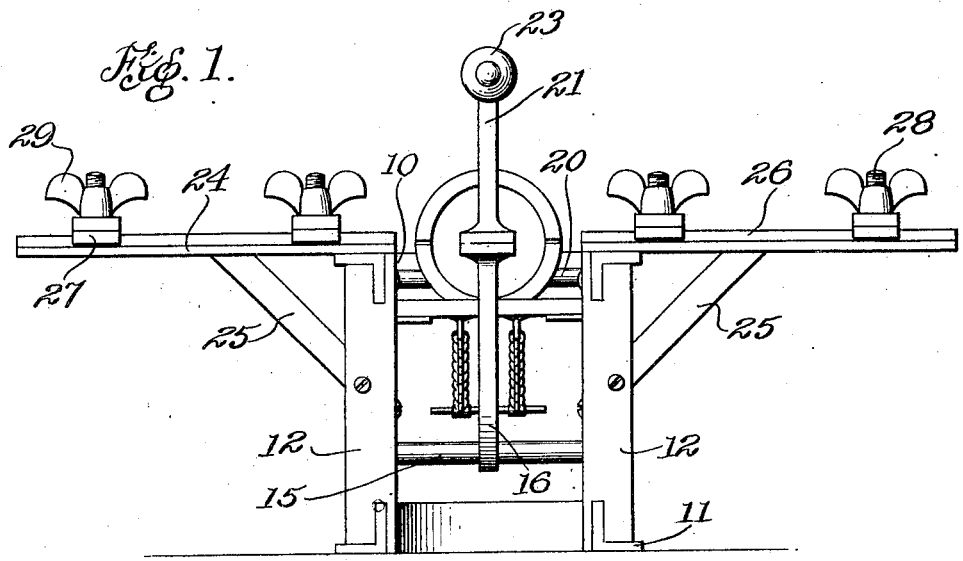
Figure 1 is a front elevation of a soldering machine constructed in accordance with the invention.
Figure 2:
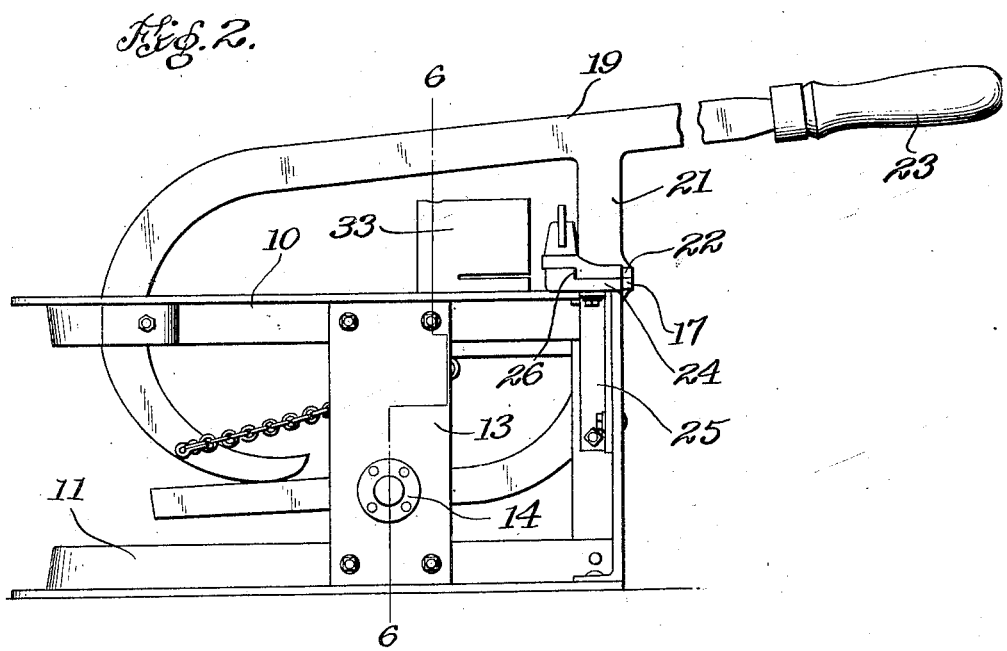
Figure 2 is a side view of the same.

Referring in detail to the drawings, wherein like characters of reference denote corresponding parts, the machine as illustrated comprises a frame which includes upper and lower horizontally disposed substantially U-shaped members 10 and 11, whose ends are joined by standards 12, all of which are preferably formed of angle iron. The U-shaped members are connected intermediate their ends by relatively wide flat bars 13 and the latter support bearings 14 for the opposite ends of a transversely disposed shaft 15.

Secured upon the shaft 15 is an arm 16 which carries at one end a relatively wide presser foot 17, while the opposite end of this arm is engaged by the curved end 18 of a pivotally mounted arm 19, the latter being mounted upon a shaft 20 having bearings in the U-shaped member 10. The arm 19 has extending therefrom a relatively short arm 21 which carries a presser foot 22 which is adapted to engage the presser foot 17 when the arms are moved pivotally toward one another. The arm 19 carries at one end a handle or grip 23 for convenience of manipulation.

Extending oppositely and outwardly from one end of the upper U-shaped member 10 are rigid arms 24 which have their inner ends secured to the said member and are braced by means of inclined angle braces 25. The arms 24 are provided along one edge with a flange 26 which defines a shoulder against which the rear edge or back of a saw blade may be engaged so that the meeting edges of the blade may be properly positioned to form a perfect joint. When the blade (which is indicated at B in Figures 3, 4 and 5 of the drawings) is positioned upon the arms 24, it may be held in proper position by means of clamping lugs 27 which are mounted upon threaded studs 28 extending from said arms and clamped in position by means of winged nuts 29.

Extending longitudinally within the frame immediately below the upper U-shaped member 10 are horizontally disposed guide flanges or rails 30 which act to slidingly support a flanged plate or pan 31. This pan is connected to the pivoted arm 19 by means of chains or other flexible members 32, so that when the arm 19 is swung downwardly the pan will move inwardly. The purpose of this pan is to support and move a furnace or heat chamber 33 which is formed of a cylindrical substantially cup-shaped member whose open end is disposed toward the open end of the frame. The furnace or heat chamber is provided with oppositely located longitudinally extending slots 34 for the passage of the saw blade B and the said furnace or chamber is flattened and has secured thereto spaced oppositely extending feet 35 to hold the furnace or chamber against lateral movement within the pan 31. An escape port 36 is provided in the upper portion of the heat chamber.

In the use of the invention, the ends of the saw blades are clamped upon the arms 24 with their meeting ends in proper contacting position, the arms 16 and 19 being separated and the furnace or heat chamber moved forward so that the meeting ends of the blade are positioned therein. Solder is applied to the joint and heat applied by the use of a blow torch or other convenient means until a proper degree of heat is obtained. The arms 16 and 19 are then moved toward one another until the presser feet 17 and 22 engage the opposite sides of the saw blade at the joint, the heat chamber 33 receding or moving out of the way due to its connection with the curved end 18 of the arm 19. When the solder is set, the arms may be separated and the joint again heated sufficiently to permit of removal of excess solder.

The invention is susceptible of various changes in its form, proportions and minor details of construction and the right is herein reserved to make such changes as properly fall within the scope of the appended claim.

Having described the invention what is claimed is:—

A saw soldering machine comprising a frame, means carried by the frame for holding the ends of the blade in position for soldering, a heat chamber movable into and out of position over the blade joint, a pivotally mounted manually movable lever carried by the frame, a second lever pivotally mounted upon the frame, there being a curved extremity included in the first mentioned lever for wiping engagement with said second lever, whereby pivotal movement of the latter will be controlled, presser feet carried by both of said levers for engagement upon opposite sides of the blade to hold the jointed ends of the latter together after the application of solder and means for automatically moving the heat chamber out of the path of the presser feet.

In testimony whereof I affix my signature.

EDMOND GALBOS.